J. McSTAY & E. F. STEVENS.
CLUTCH PULLEY.
APPLICATION FILED JULY 19, 1910.
989,274.
Patented Apr. 11, 1911.
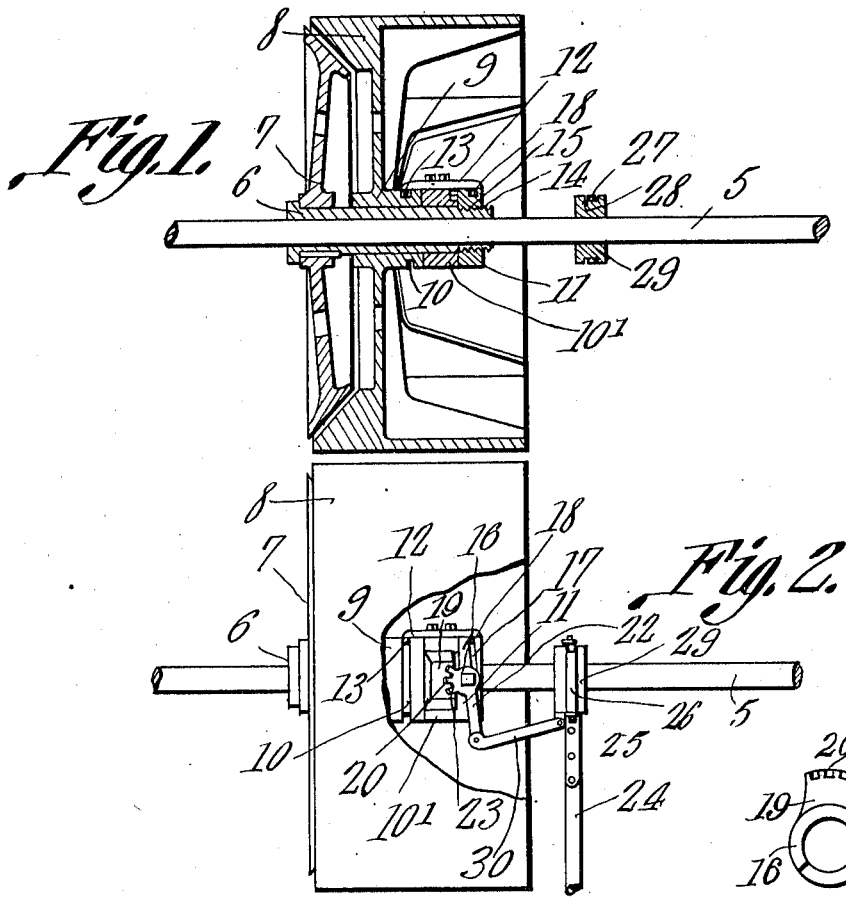
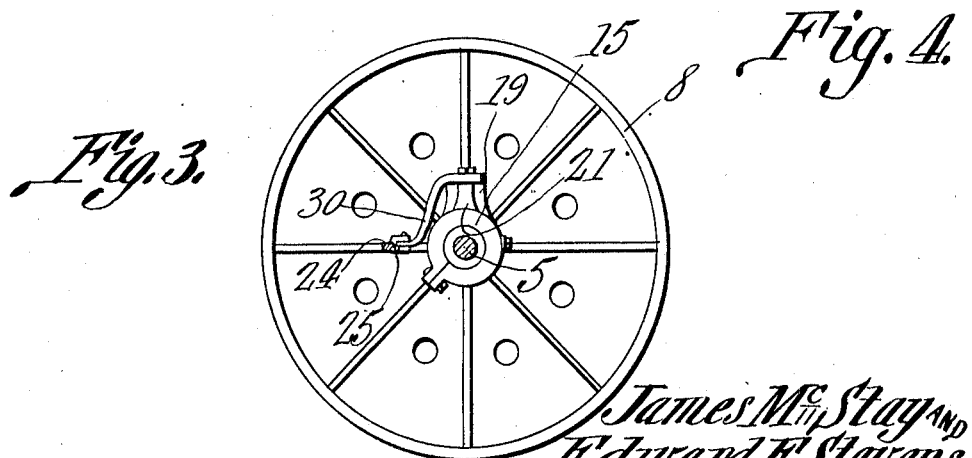
Witnesses
James McStay and
Edward F. Stevens
Inventor
by C. A. Snow & Co.
Attorneys

UNITED STATES PATENT OFFICE.

JAMES McSTAY AND EDWARD F. STEVENS, OF CYGNET, OHIO.

CLUTCH-PULLEY.

989,274.

Specification of Letters Patent.

Patented Apr. 11, 1911.

Application filed July 19, 1910. Serial No. 572,745.

*To all whom it may concern:*

Be it known that we, JAMES McSTAY and EDWARD F. STEVENS, citizens of the United States, residing at Cygnet, in the county of Wood, State of Ohio, have invented a new and useful Clutch-Pulley, of which the following is a specification.

The present invention aims to improve the construction of clutch pulley shown in our prior Patent No. 960,599, issued June 7, 1910, and the improvements of the present invention are directed more especially to the means for operating or rotating the clutch cam of the pulley.

In general, the invention aims to simplify the construction of this operating means of the device and render the same less likely to get out of order and more certain in its operation.

With the above and other objects in view, the present invention consists in the general construction and arrangement of parts shown in the accompanying drawings, in which, Figure 1 is a vertical longitudinal sectional view through a pulley constructed in accordance with the present invention. Fig. 2 is a view in front elevation thereof, parts being broken away. Fig. 3 is a side elevation, parts also being broken away. Fig. 4 is a detail view in side elevation of a cam embodied in the structure.

In the drawings, the numeral 5 indicates the shaft upon which the clutch pulley embodying the present invention is mounted and secured upon this shaft in any suitable manner is an elongated hub 6 upon which in turn, is fixed the driving member 7 of the clutch, this member being of the ordinary friction type. Freely rotatable upon the elongated hub 6 is the driven member of the clutch indicated by the numeral 8 and this latter member is in the form of a belt pulley, it being so constructed and arranged with respect to the member 7 as to coöperate therewith when moved to position against the said member. The hub of the member 8 is indicated by the numeral 9 and is formed with a circumscribing groove 10 the function of which groove will be presently explained. The end of the hub 9 adjacent the groove 10 is plane and fitted upon the hub 6 with its plane end against the said end of the hub 9 is the clutch cam of the device, this cam being in the nature of a collar having one end formed with cam portions 11 as in my aforesaid patented structure.

There is secured upon the cam collar 10' above mentioned, a short bar indicated by the numeral 12 and formed with a depending lug 13 located upon and projecting into the groove 10 in the hub of the pulley member 8 of the clutch. The projection of this lug into the groove 10 serves to hold the cam collar against movement away from the said hub and at the same time allows of rotation of the cam collar with respect to the hub. Outwardly of the collar 10' there is fixed upon the sleeve 6, by being threaded thereon as at 14 a second cam collar 15 having cam portions 16 coöperating with the cam portions 11 of the first described collar and this latter collar 15 is formed with a groove 17 which extends parallel to one of the faces 16 and into it projects a lug 18 formed at the outer end of the bar 12. At this point it will be readily understood that should the cam collar be rotated with respect to the cam collar 15 toward the right in Fig. 3 of the drawings or in other words upwardly in Fig. 2 of the drawings, the cam portions of the two collars will coöperate to force the collar 10' to the left in Fig. 1 of the drawings and this movement of the collar will impart a corresponding movement to the hub 9 and the pulley member 8 of the clutch thereby bringing this member into coöperative relation with respect to the member 7. The cam collar 15, as will be observed from an inspection of Fig. 3 of the drawings, is a split collar and is consequently to be firmly clamped upon the threaded end of the sleeve hub 6.

The improvements contemplated by the present invention are directed to the means provided for rotating the cam collar 10' as above stated and this means will now be specifically described.

The collar 10' is formed with an outstanding boss indicated by the numeral 19 and this, at its upper end and in that face which is presented to the right in Figs. 1 and 2 of the drawings, is formed with teeth indicated by the numeral 20. In a like manner, the cam collar is formed with an outstanding boss 21 upon which is pivoted a rock arm 22 this arm at its pivoted end being enlarged and formed with teeth indicated by the numeral 23, these teeth being in mesh with the teeth 20. It will now be readily understood that by swinging the arm 22 to the left in Fig. 2 of the drawings, the toothed enlarged end of the arm will be so rocked as to cause rotative movement of the cam collar 10' toward the right in Fig. 3 of the drawings. This movement of the cam collar 10' will result in a movement of pulley member 8 of the clutch to the left in Fig. 1 as before stated. The means provided for so swinging the arm 22 embodies a lever which is indicated by the numeral 24 and is pivoted as at 25 to any suitable fixed support adjacent the shaft 5. This lever has a yoke 26 having pivotal connection with a ring or collar 27 fitted in a groove 28 formed in a collar 29 fixed upon the shaft 5 beyond the threaded end of the sleeve hub 6. A bar 30 is pivoted at one end to the arm 22 and at its other end to a lug upon the collar 29 so that when the handle end of the lever 24 is swung to the right in Fig. 2 of the drawings its yoke end 26 will be swung to the left and the arm 22 will also be swung to the left producing the results above described.

What is claimed is:—

1. In a clutch pulley, a driving member having a hub, a driven member rotatable upon the hub, a cam collar having limited rotative movement upon the hub and having bearing against the said driven member, a cam collar fixed upon the hub and coöperating with the first mentioned collar, the first mentioned collar being provided with teeth, and an arm carried by the fixed cam collar and having teeth meshing with the teeth upon the first mentioned cam collar, the said arm being adapted to be rocked whereby to rotate the first mentioned cam collar.

2. In a clutch pulley, a driving member having a hub, a driven member rotatable upon the hub, a cam collar having limited rotative movement upon the hub and having bearing against the said driven member, a cam collar fixed upon the hub and coöperating with the first mentioned collar, the first mentioned collar being provided with teeth, and an arm carried by the fixed cam collar and having teeth meshing with the teeth upon the first mentioned cam collar, the said arm being adapted to be rocked whereby to rotate the first mentioned cam collar, and means whereby the arm may be so rocked, said means comprising a rotatable collar, a ring loosely fitted thereon, a lever pivoted to the ring, and an arm connected to the first mentioned arm and to the collar.

3. In a clutch pulley, a driving member having a hub, a driven member having a hub rotatably fitted upon the first mentioned hub, the hub of the said driven member being formed with a groove, a cam collar having limited rotative movement upon the hub of the driving member and having bearing against the hub of the driven member, a cam collar fixed upon the hub of the said driving member and coöperating with the first mentioned cam collar, the last mentioned cam collar being formed with a cam screw, a bar secured upon the first mentioned cam collar and having lugs fitting in the grooves in the hub of the driven member and in the groove in the said fixed shaft member, and means for imparting rotative movement to the said first mentioned cam collar.

4. In a clutch pulley, a driving member having a hub, a driven member having a hub rotatably fitted upon the first mentioned hub, the hub of the said driven member being formed with a groove, a cam collar having limited rotative movement upon the hub of the driving member and having bearing against the hub of the driven member, a cam collar fixed upon the hub of the said driving member and coöperating with the first mentioned cam collar, the last mentioned cam collar being formed with a cam screw, a bar secured upon the first mentioned cam collar and having lugs fitting in the grooves in the hub of the driven member and in the groove in the said fixed shaft member, and means for imparting rotative movement to the first mentioned cam collar, the said means comprising a plurality of teeth upon the said first mentioned cam collar, and a toothed rock arm upon the last mentioned cam collar, the teeth of the rock arm meshing with the teeth upon the first mentioned cam collar.

In testimony that we claim the foregoing as our own, we have hereto affixed our signatures in the presence of two witnesses.

JAMES McSTAY.
EDWARD F. STEVENS.

Witnesses:
CLELL SOLETHER,
C. F. SOLETHER.

---

Copies of this patent may be obtained for five cents each, by addressing the "Commissioner of Patents, Washington, D. C."